May 23, 1961 R. S. WILLIAMS 2,985,182
ELECTRO-PNEUMATIC CONVERTERS
Filed April 22, 1959

Ray S. Williams
INVENTOR.
BY Gerald B. Tjoflat
His Attorney

United States Patent Office 2,985,182
Patented May 23, 1961

2,985,182

ELECTRO-PNEUMATIC CONVERTERS

Ray S. Williams, Orrville, Ohio, assignor to Hagan Chemicals & Controls, Inc., Pittsburgh, Pa., a corporation of Pennsylvania Filed Apr. 22, 1959, Ser. No. 808,116

12 Claims. (Cl. 137—85)

This invention relates to electro-pneumatic converters.

An object of this invention is to provide an electro-pneumatic converter that is so constructed as to occupy small space, and yet be sensitive and capable of receiving small electric inputs, indicative of a condition to be measured, controlled or measured and controlled, and converting those inputs into pneumatic output signals having a relatively wide range of substantial magnitude.

Another object is to provide a converter that is provided with feed-back means responsive to the output signal for balancing the input signals.

A still further object is to provide a feed-back balancing device so constructed that it is capable of receiving a bias signal whereby the operating characteristics of the converter may be modified from a point remote from the device, or the output range of the converter may be modified by applying a set point signal to the feed-back balancing means.

Other objects of the invention will be apparent to those of ordinary skill in the art to which the invention pertains, from the following description and the drawings.

Figure 1:
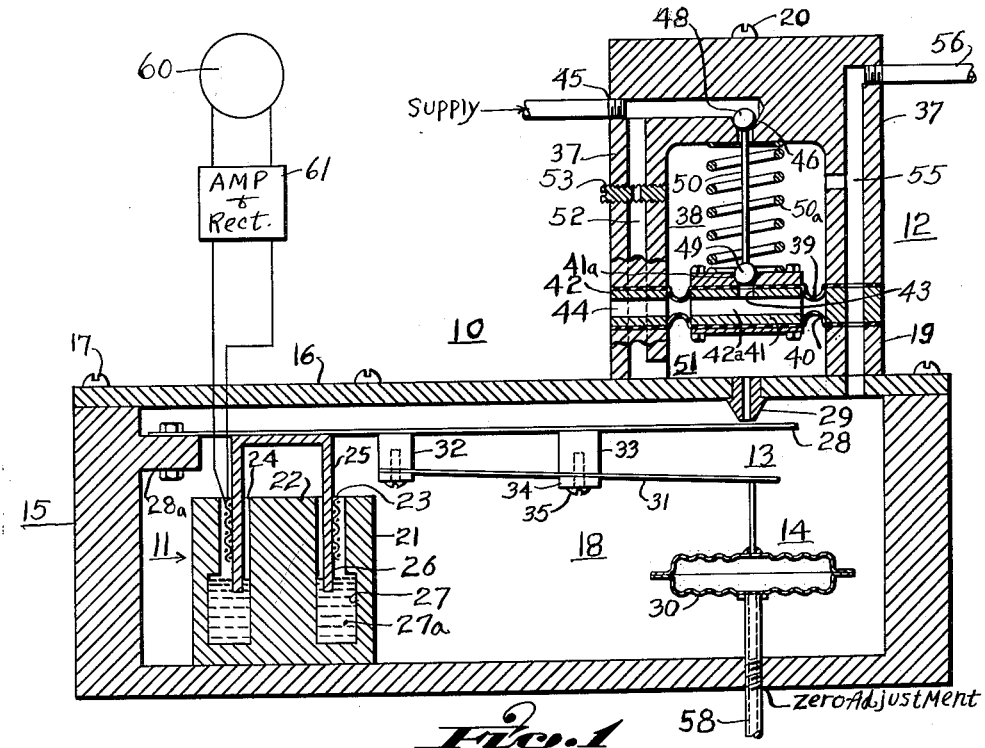
Figure 1 is a view in longitudinal vertical section of an electro-pneumatic converter arranged and constructed in accordance with what now appears to be a preferred embodiment of the invention.
Figure 2:
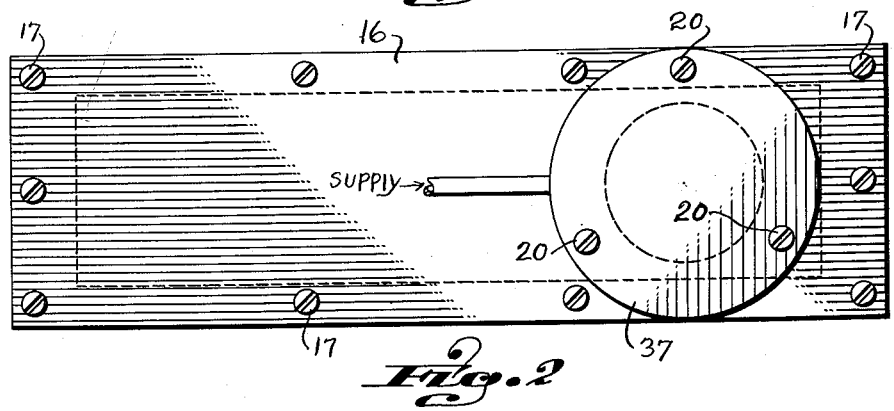
Fig. 2 is a top plan view of the converter.
Figure 3:
Fig. 3 is a plan view of an orifice member embodied in the device of Figs. 1 and 2.

In the drawings, an embodiment 10 of the electro-pneumatic converter is shown as comprising an electromagnetic signal receiving means 11, a diaphragm valve assembly 12, means 13 actuated by the input signal receiving means 11 for developing operating power for the valve assembly and a signal output feed-back responsive balancing means 14.

The means 11, 13 and 14 are disposed in a housing 15 having a gasketed cover 16 secured thereto by screws 17 so as to provide a pressure-tight chamber 18. The cover 16 may be provided with an annular boss 19 to which the valve assembly 12 may be secured with screws 20 or other suitable means.

The signal receiving means 11 comprises a cup-shaped stator 21 of magnetic material having a central magnetic core 22 of a permanent magnet composition, and a coil winding 23 disposed in the air gap 24 of the stator. Winding 23 may be carried by a relatively thin walled cylindrical member 25. The winding 23 is placed near the top of member 25 so that it has a relatively long skirt portion 26 extending downwardly into the annulus 27 of the core. The annulus is provided with a quantity of viscous liquid 27a so that the liquid reacts with the member 25 to form a stabilizing damper for the converter.

Motion of the coil winding 23 and its support member 25 is utilized to actuate the control means 13. Means 13 comprises a flap member 28 which is secured at one end to a boss or lug 28a on the adjacent end wall of housing 15. The free end controls a jet 29 by which the operating pressure for the valve assembly is generated, as will be explained infra.

The feed-back responsive means 14 comprises preferably a hollow pressure deflectable bellows 30 mounted on the bottom wall of the housing 15 and a modifying or calibrating leaf member 31 carried by the flap 28. The member 30 compresses or contracts as the pressure in the housing 15 increases, and it expands as that pressure decreases because of its natural springy characteristics.

One end of the member 31 is secured to a boss 32 carried by member 28 at a location relatively near to the means 11. A spacer 33 is placed between members 28 and 31 and secured by a clamp 34 and a screw 35 to the latter, so as to be longitudinally adjustable between the free and fixed ends thereof. The spacer 33 being longer than the boss 32, the free end of the flap 28 may be adjusted away from or towards the jet 29 so as to modify the operating characteristics of the converter 10.

The valve assembly 12 comprises a valve body 37 having a chamber 38 therein which is closed at the bottom by diaphragms 39 and 40 extending across the opposite faces of a space 42a in which the exhaust port 41a of the valve is formed. An annular spacer 42 is placed between the body 37 and the boss 19 so that when the body is secured by the screws 20 to the boss, the marginal edges of the diaphragms are securely clamped to prevent leakage of air to the atmosphere. Member 41 is provided with a passageway 43 communicating with exhaust port 41a and leading to the space between the diaphragms, that space being vented to the atmosphere through a passageway 44 in the spacer.

The body 37 is provided with a pressure supply port 45 that leads to an inlet valve port 46. Compressed air at constant value is furnished at port 45. Port 46 and exhaust port 41a in member 41 are controlled by valve members 48 and 49, shown as being spherical, and which are connected by a valve stem 50. The diaphragms 40 and 39 are urged downwardly by means of a compression spring 50a. That spring assures seating of the valve 48 on the inlet port under certain conditions and it also assures that there will be a positive built-in pressure differential across the jet 29 so as to prevent the pressure in chamber 18 exceeding the pressure in the space 51 immediately below diaphragm 40.

The jet 29 is supplied with pressure from chamber 51, that chamber being supplied from the supply port 45 through a passageway 52 which is offset with respect to the vent port or passage 44. In the passageway 52 is an orifice 53 for regulating the pressure in the chamber 51 in accordance with the position of the flap 28 with respect to the tip of the orifice or jet 29.

Chamber 38 of the valve body leads to an outlet passageway 55. That passageway leads to a signal transmission line 56 and to the chamber 18 in the housing 15. Thus, the output signal pressure is fed back so as to act on the feed-back responsive means 14.

The feed-back responsive bellows 30, being hollow, as above stated, it may be used as a means of providing an externally generated or remotely controlled bias to the operation of the flap 28. Thus, for example, by connecting the interior of the bellows 30 to a pipe or conduit 58, a set point or bias pressure may be supplied from a remote point so as to modify the output range of the output signal in line 56 with respect to the range of the input signal to the coil windings 23.

The coil windings 23 are disposed to receive direct current signals of small magnitude from a means 60 that develops an electric output in response to variations in a variable condition to be measured, regulated or measured and regulated. If the signal produced by the means 60 is alternating current, that current may be amplified and rectified to direct current by an amplifier-rectifier 61 of any known and suitable construction. The rectified output current being D.C. will give direction of motion to the coil winding 23 depending upon the intensity of the current. The stronger the current, the more the coil winding will be pulled into the annulus 27. That force is opposed by the spring action of the flap 28.

As the flap 28 moves away from the jet 29, the pressure in chamber 51 is reduced because of the increased flow of air through it and the resulting increased pressure drop across the orifice. The pressure in chamber 51 being thus reduced, the spring in chamber 38 moves the diaphragms downwardly whereupon the inlet port to chamber 38 is closed and the exhaust port is opened thereby exhausting pressure from chamber 38. When the forces of the spring 51a and the force of the pressure in chamber 38 on diaphragm 41 balance the force of the pressure in chamber 51 on diaphragm 40, the exhaust valve closes.

When the pressure in chamber 38 is reduced, as above described, the pressure in the feed-back chamber 18 is also reduced, thereby causing the bellows 30 to expand and actuate the flap 28 towards the tip of the jet 29. As the flap moves closer to the tip of the jet, the flow of air through that jet decreases, causing the pressure in chamber 51 to increase because the pressure drop across the orifice decreases and approaches that of the pressure of the supply, depending upon how much the tip of the jet is closed.

As the flow through the jet 29 decreases, the pressure in chamber 51 increases causing the diaphragms 40 and 39 to move upwardly and unseat the inlet port, thereby allowing more pressure to build up in the chambers 38 and in the feedback passage 55 and the output signal pipe 56. As the pressure in chamber 18 increases, the bellows 30 contracts, thereby moving the flap 28 away from the jet and thereby reducing the pressure in chamber 51 until the pressure in that chamber and in chambers 38 are in balance.

Thus, small changes in input signal to the coil winding 23 will produce quick changes in the position of the flap 28 with respect to the jet 29, causing quick changes in pressure in chamber 51 to occur whereby the valve is so actuated that the pressures in chamber 38 and the feedback passage 55 are quickly changed in magnitude and in the direction called for by the input signal to the coil winding 23.

If a bias pressure is supplied to the bellows 30, it will expand and tend to adjust the flap 28 to a relatively closed position with respect to the tip of the jet 29. That will tend to normally carry a higher signal pressure in the chamber 38 and the signal pipe 56. The feed-back pressure will also be higher in chamber 18. Therefore, the range of pressure in the output pipe 56 with respect to the input current to the coil winding 23 can thus be adjusted one with respect to the other.

Having thus described the invention, it will be apparent to those of ordinary skill in the art to which the invention pertains that various modifications and changes may be made in the illustrated embodiment without departing from either the spirit or the scope of the invention.

Therefore, what is claimed as new and desired to be secured by Letters Patent is:

1. An electro-pneumatic converter comprising a pressure-tight housing constituting a feed-back chamber, an electromagnetic device in said housing, including an armature having a permanent magnet core, a tubular support embracing said core and having a coil winding thereon disposed to be energized by D.C. current that varies in magnitude with a variable condition, a jet flap member supporting said coil winding, a jet disposed to discharge into said feed-back chamber and having its tip adjacent said flap member whereby flow through the tip varies as the flap member moves toward or away from the same, a pneumatic valve assembly comprising a valve body having a chamber therein and a diaphragm assembly extending across the same so as to subject one side of said assembly to the pressure in said body chamber, said assembly having a chamber on the opposite side of the body chamber for receiving pressure for actuating the diaphragm assembly, the valve body having a pressure supply port, an inlet valve port seat supplied by said supply port, an exhaust port seat in the diaphragm assembly having a passage leading to the atmosphere, resilient means acting on the diaphragm means with substantially constant pressure normally urging the diaphragm means in a direction to close the inlet port and open the exhaust port, a valve stem having valves at each end thereof controlling the inlet and exhaust ports, the body having a signal outlet port and a passage leading from the supply port to said diaphragm actuating pressure chamber and having an orifice therein, the pressure drop across said orifice decreasing as said jet flap approaches the tip of said jet thereby increasing the diaphragm actuating pressure, and increasing as the jet flap moves away from said jet tip, whereby the diaphragm assembly actuates the valve stem to increase the valve body pressure with increasing values of coil current and to decrease that pressure as the coil current decreases, a feed-back passageway leading from the valve body chamber to the feed-back chamber and means responsive to said feed-back pressure for actuating said jet flap away from said jet tip so as to restore balance between the pressure in the valve body and the pressure actuating chamber for said diaphragm assembly.

2. A converter as in claim 1 in which the resilient means is a light compression spring provided in the valve body chamber urging the diaphragm assembly in a direction to close the inlet port seat and to uncover the exhaust port seat, whereby a positive minimum pressure drop is provided across said jet.

3. An electro-pneumatic converter comprising a pressure-tight housing constituting a feed-back chamber, an electromagnetic device in said housing, including an armature having a permanent magnet core, a tubular support embracing said core and having a coil winding thereon disposed to be energized by D.C. current that varies in magnitude with a variable condition, a jet flap member mounted at one end in said housing and having its free end disposed to control a jet, said jet flap member supporting said coil winding, a jet disposed to discharge into said feed-back chamber and having its tip adjacent said flap member whereby flow through the tip varies as the flap member moves toward or away from the same, a pneumatic valve assembly comprising a valve body having a chamber therein and a diaphragm assembly extending across the same so as to subject the assembly on one side to pressure in said body chamber, said valve assembly having a chamber on the opposite side of said diaphragm assembly for receiving pressure for actuating the same, said jet providing communication between said chamber and said feed-back chamber, the valve body having a pressure supply port, an inlet valve port seat supplied by said supply port, an exhaust port seat in the diaphragm assembly leading to the atmosphere, resilient means acting on the diaphragm means with substantially constant pressure normally urging the diaphragm means in a direction to close the inlet port and open the exhaust port, a valve stem having valves at each end thereof controlling the inlet and exhaust ports, the body having a signal outlet port and a passage leading from the supply port to said diaphragm assembly actuating chamber and having an orifice therein, the pressure drop across said orifice decreasing as said jet flap approaches the tip of the jet thereby increasing the pressure in the diaphragm actuating chamber and decreasing as the jet flap moves away from said jet tip, whereby the diaphragm assembly actuates the valve stem to increase the valve body pressure with increasing values of coil current and to decrease that pressure as the coil current decreases, a feed-back passageway leading from the valve body chamber to the feed-back chamber and means responsive to said feed-back pressure for actuating said cantilever away from said jet tip so as to restore balance between the pressures in the valve body and diaphragm assembly actuating chambers.

4. A converter as in claim 3 in which the resilient means is a light compression spring provided in the valve body chamber urging the diaphragm assembly in a direction to close the inlet port seat and to uncover the exhaust port seat, whereby a positive minimum pressure drop is provided across said jet.

5. A converter as in claim 1 in which the feed-back pressure responsive means comprises a hollow pressure deflectable member the exterior of which is responsive to the feed-back chamber pressure and the interior of which communicates with the exterior of said feed-back chamber, said pressure deflectable member being connected to said jet flap so as to actuate the same in a direction opposite to that in which it is actuated by said coil winding.

6. A converter as in claim 5 in which the interior of said pressure deflectable member is responsive to a set point pressure whereby motion of the pressure deflectable member is proportional to the difference between the feed-back chamber pressure and the set point pressure.

7. An electromagnetic converter as in claim 1 in which the electromagnetic device comprises a stator of cup shape having a central core so as to provide an annulus about the core, the bottom of said annulus having a quantity of damping liquid therein, and that the tubular support for said coil winding embraces the core and has a skirt extending downwardly to coact with said liquid to produce a damping action on the jet flap actuated by said winding.

8. A converter according to claim 3 in which the electromagnetic device comprises a stator of cup shape having a central core so as to provide an annulus about the core, the bottom of said annulus having a quantity of damping liquid therein, and that the tubular support for said coil winding embraces the core and has a skirt extending downwardly to coact with said liquid to produce a damping action on the jet flap actuated by said winding.

9. An electro-pneumatic converter comprising a valve assembly having a body provided with a chamber and a diaphragm means therein, said body having a valve inlet port, a pressure supply port therefor and a signal outlet port leading from said chamber, the diaphragm means having an exhaust port for controlling the discharge of pressure from the body chamber to the atmosphere, and valve means actuated by said diaphragm means for controlling said inlet and exhaust ports, resilient means acting on the diaphragm means with substantially constant pressure normally urging the diaphragm means in a direction to close the inlet port and open the exhaust port, means forming a diaphragm actuating pressure chamber for said diaphragm means at a location opposite the valve body chamber, a passageway in the body leading from said supply port to said pressure actuating chamber and having an orifice therein, a housing associated with said valve body forming a feed-back chamber, a jet having its tip in said housing and providing communication between said diaphragm means actuating chamber and said feed-back chamber, means providing a pressure connection from said signal outlet port of the valve body to said feed-back chamber, a flap member supported in said feed-back chamber and disposed adjacent the tip of said jet and being movable towards and away from the same, an electromagnetic means comprising a stator having a core of permanent magnetic material and a coil winding embracing said core and secured to said flap member, and means in said feed-back chamber comprising a hollow pressure deflectable member and responsive to the pressure in said feed-back chamber for actuating said flap in a direction opposite to that in which it is actuated by said coil winding when traversed by D.C. current, increasing values in current moving said flap towards the tip of said jet to increase the diaphragm means actuating pressure, thereby establishing increasing pressures in said valve body chamber while decreasing values occurring in said coil winding moves said jet flap away from said jet tip to establish lower diaphragm means actuating pressures and lower pressures in said valve body chamber.

10. A converter as in claim 9 in which the hollow pressure deflectable member in said feed-back chamber is provided with means for supplying a set point pressure to the interior thereof, whereby the feed-back means modifies the action of the jet flap in accordance with the difference between the feed-back chamber pressure and said set point pressure.

11. A converter as in claim 9 in which the electromagnetic means comprises a cup-shaped armature having a centrally disposed core of permanent magnetic material, a tubular support member embracing said core and movable relative thereto and having at its upper end a coil winding responsive to variable D.C. current input, said coil winding support member being secured to said jet flap member and having a depending skirt extending towards the bottom of said annulus, said annulus containing a quantity of damping liquid for coaction with said skirt to damp the motion of said coil winding and its jet flap support.

12. A converter as in claim 3 in which the electromagnetic means comprises a cup-shaped armature having a centrally disposed core of permanent magnetic material, a tubular support member embracing said core and movable relative thereto and having at its upper end a coil winding responsive to variable D.C. current input, said coil winding support member being secured to said jet flap member and having a depending skirt extending towards the bottom of said annulus, said annulus containing a quantity of damping liquid for coaction with said skirt to damp the motion of said coil winding and its jet flap support.

References Cited in the file of this patent

UNITED STATES PATENTS

| | | |
|---|---|---|
| 2,422,362 | Moore | June 17, 1947 |
| 2,780,230 | Freeman | Feb. 5, 1957 |

OTHER REFERENCES

Builders Iron Foundry Publication No. 285.20A-1, published January 1959.